(12) United States Patent
Kaegi

(10) Patent No.: US 8,839,233 B2
(45) Date of Patent: Sep. 16, 2014

(54) DISCOVERING AND INSTALLING WEB APPLICATION PLUGINS

(71) Applicant: International Business Machines Corporation, Armonk, NY (US)

(72) Inventor: Simon Richard Kaegi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/843,853

(22) Filed: Mar. 15, 2013

(65) Prior Publication Data

US 2013/0218954 A1  Aug. 22, 2013

Related U.S. Application Data

(63) Continuation of application No. 13/309,509, filed on Dec. 1, 2011, now abandoned.

(51) Int. Cl.
*G06F 9/445* (2006.01)
*H04L 29/08* (2006.01)
*G06F 17/21* (2006.01)
*G06F 17/30* (2006.01)

(52) U.S. Cl.
CPC .... *H04L 67/10* (2013.01); *G06F 8/61* (2013.01); *G06F 17/21* (2013.01); *G06F 9/445* (2013.01); *G06F 17/30* (2013.01); *G06F 9/44526* (2013.01); *H04L 67/02* (2013.01)
USPC ............... 717/176; 717/111; 717/826

(58) Field of Classification Search
CPC ......................................... G06F 8/61

USPC ................... 717/111, 176; 715/826
See application file for complete search history.

(56) References Cited

U.S. PATENT DOCUMENTS

| 8,352,967 | B2 * | 1/2013 | Labour et al. | 719/328 |
| 8,370,482 | B2 * | 2/2013 | Shustef | 709/224 |
| 2010/0121893 | A1 * | 5/2010 | Uhrhane et al. | 707/822 |
| 2013/0076797 | A1 * | 3/2013 | Hou | 345/668 |
| 2013/0080887 | A1 * | 3/2013 | Hou | 715/273 |

OTHER PUBLICATIONS

Walden et al., "Impact of Plugins on the Security of Web Applications", Sep. 15, 2010.*
Bailer, "Writing ImageJ Plugins—A tutorial" Jul. 2, 2006.*

* cited by examiner

*Primary Examiner* — Phillip H Nguyen
(74) *Attorney, Agent, or Firm* — Nelson and Nelson; Daniel P. Nelson; Alexis V. Nelson

(57) ABSTRACT

A method for discovering and installing web application plugins is disclosed. In one embodiment, such a method includes initiating a client-side component of a server-based web application. The client side-component hosts a first document. The method opens an inline frame, such as an IFrame or Web Worker, within the first document that hosts a second document. The method uses cross-document messaging to communicate, from the second document to the first document, metadata describing a plugin's capabilities and metadata describing an API to access the plugin's capabilities via cross-document messaging. The method utilizes the capabilities of the plugin using cross-document messaging in accordance with the API. A corresponding system and computer program product are also disclosed.

20 Claims, 5 Drawing Sheets

DISCOVERING AND INSTALLING WEB APPLICATION PLUGINS

BACKGROUND

1. Field of the Invention

This invention relates to systems and methods for discovering and installing plugins for web applications.

2. Background of the Invention

A web application is an application that is accessed over a network such as the Internet. Commonly, web applications are applications hosted in browser-controlled environments (e.g., Java applets) or coded in browser-supported languages (e.g., JavaScript combined with a browser-rendered markup language such as HTML) and reliant on web browsers for execution. Web applications are popular because of the ubiquity of web browsers and the convenience of using a web browser as a client, also referred to as a thin client. The ability to update and maintain web applications without distributing and installing software on potentially thousands of client computers is a key reason for their popularity, as is the inherent support for cross-platform compatibility. Common web applications include web email, online retail sales, online auctions, and the like.

Typically, adding new functionality (also referred to as "plugins" or "extensions") to a web application that is designed for extensibility involves installing new software on the origin server (i.e., the server hosting the web application). In cases where the new functionality is not directly installable on the origin server, the origin server may act as a proxy to another server that offers the new functionality. Both of these approaches, however, may be subject to administrative overhead and delay, since users may need to wait for administrators to add or reference the new functionality before the new functionality is available for use. In many cases, adding or referencing the new functionality is a non-trivial and expensive process. In many environments, any modification to server-side resources is considered highly undesirable since the modification has the potential to destabilize the web application and cause an outage for all users.

In view of the foregoing, what are needed are improved systems and methods to add new functionality to web applications. Ideally, such systems and methods can be implemented without modifying server-side resources, thereby reducing the chance that the addition will cause an outage. Such systems and methods will also ideally provide security and privacy to users wishing to use the new functionality.

SUMMARY

The invention has been developed in response to the present state of the art and, in particular, in response to the problems and needs in the art that have not yet been fully solved by currently available systems and methods. Accordingly, the invention has been developed to provide improved systems and methods for discovering and installing web application plugins. The features and advantages of the invention will become more fully apparent from the following description and appended claims, or may be learned by practice of the invention as set forth hereinafter.

Consistent with the foregoing, a method for discovering and installing web application plugins is disclosed herein. In one embodiment, such a method includes initiating a client-side component of a server-based web application. The client side-component hosts a first document. The method opens an inline frame, such as an IFrame or Web Worker, within the first document that hosts a second document. The method uses cross-document messaging to communicate, from the second document to the first document, metadata describing a plugin's capabilities and metadata describing an API to access the plugin's capabilities via cross-document messaging. The method utilizes the capabilities of the plugin using cross-document messaging in accordance with the API.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
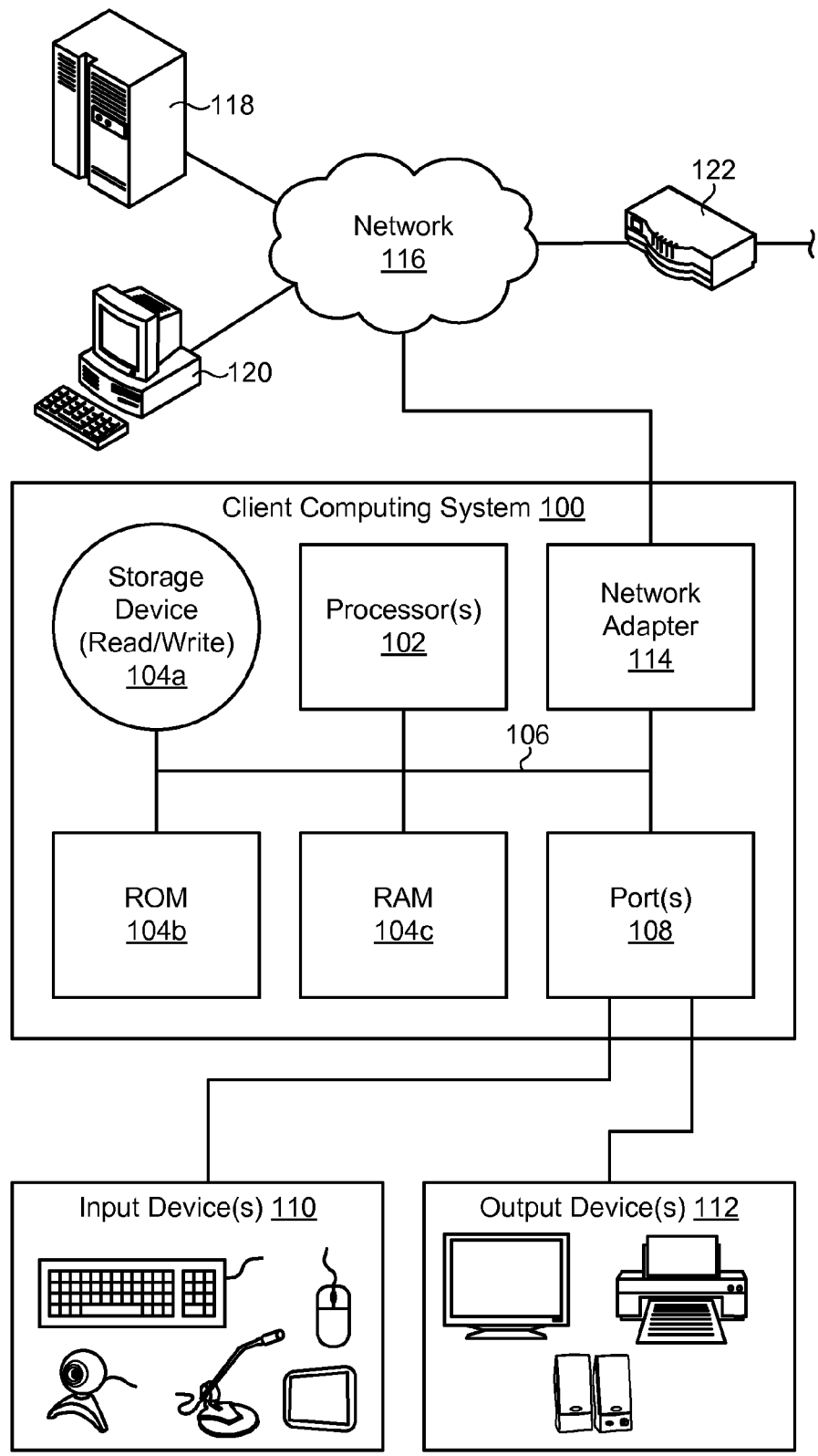
FIG. 1 is a high-level block diagram showing one example of a client computing system in which a method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device.

More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a client computing system 100 is illustrated. The computing system 100 is presented to show one example of an environment where a method in accordance with the invention may be implemented. The computing system 100 is presented only by way of example and is not intended to be limiting. Indeed, the methods disclosed herein may be applicable to a wide variety of different computing systems in addition to the computing system 100 shown. The methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
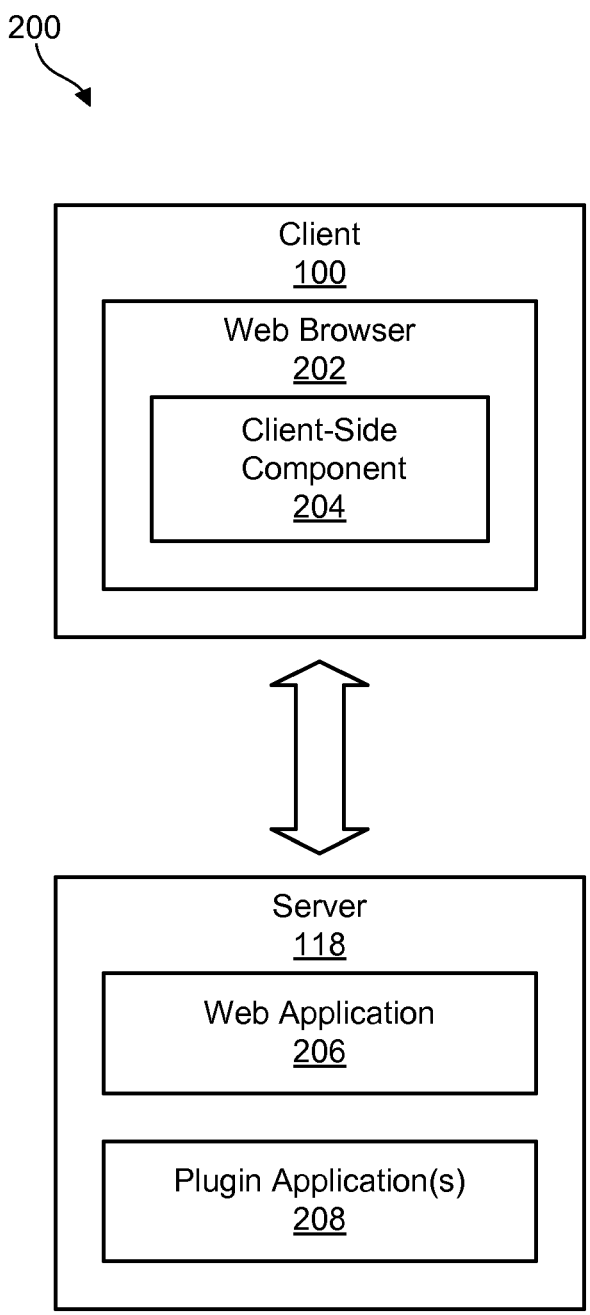
FIG. 2 is a high-level block diagram showing a conventional system and method for installing a web application plugin.

Referring to FIG. 2, one example of a conventional system 200 for adding functionality to a web application 206 is illustrated. As shown, a web application 206 is stored on a server 118, also referred to as an origin server 118. This web application 206 may be accessed by a client computer 100 over a network such as the Internet or an intranet. As shown, the web application 206 includes a client-side component 204 which is hosted in a web browser 202 of the client computer 100. In one example, the client-side component 204 includes software applications such as Java applets that are configured to run in the web browser 202 using a Java Virtual Machine (Java Virtual Machine 202). In another example, the client-side component 204 includes software applications that are coded in browser-supported languages, such as JavaScript, or JavaScript combined with a browser-rendered markup language such as HTML. Other examples of client-side components 204 are possible and within the scope of the invention.

In a conventional system 200 such as that illustrated in FIG. 2, adding new functionality (referred to hereinafter as "plugins" 208 or "plugin applications" 208) to a web application 206 that is designed for extensibility may involve installing new applications 208 on the origin server 118. Adding functionality in this manner can be both non-trivial and expensive. For example, properly installing and configuring a plugin application 200 may involve issues such as deciding which users of the web application 206 will be allowed to see and/or use the new functionality 208 (i.e., some users may not want or require the new functionality 208, while other users may be prohibited or restricted from using the new functionality 208). In short, installing and configuring new plugin applications 208 may involve substantial administrative overhead, requiring users to wait for an administrator to add new functionality 208 to the origin server 118 before the new functionality 208 can be used.

Adding new applications 208 to the origin server 118 unfortunately has the potential to destabilize the origin server 118. This is highly undesirable since any destabilization may cause the web application 206 to experience an outage, possibly denying access to all users. For example, an outage associated with a web banking application 206 or similar web applications 206 can be extremely expensive, even for very short periods of time. Thus, modifying the origin server 118 in any way may be viewed as highly undesirable.

Figure 3:
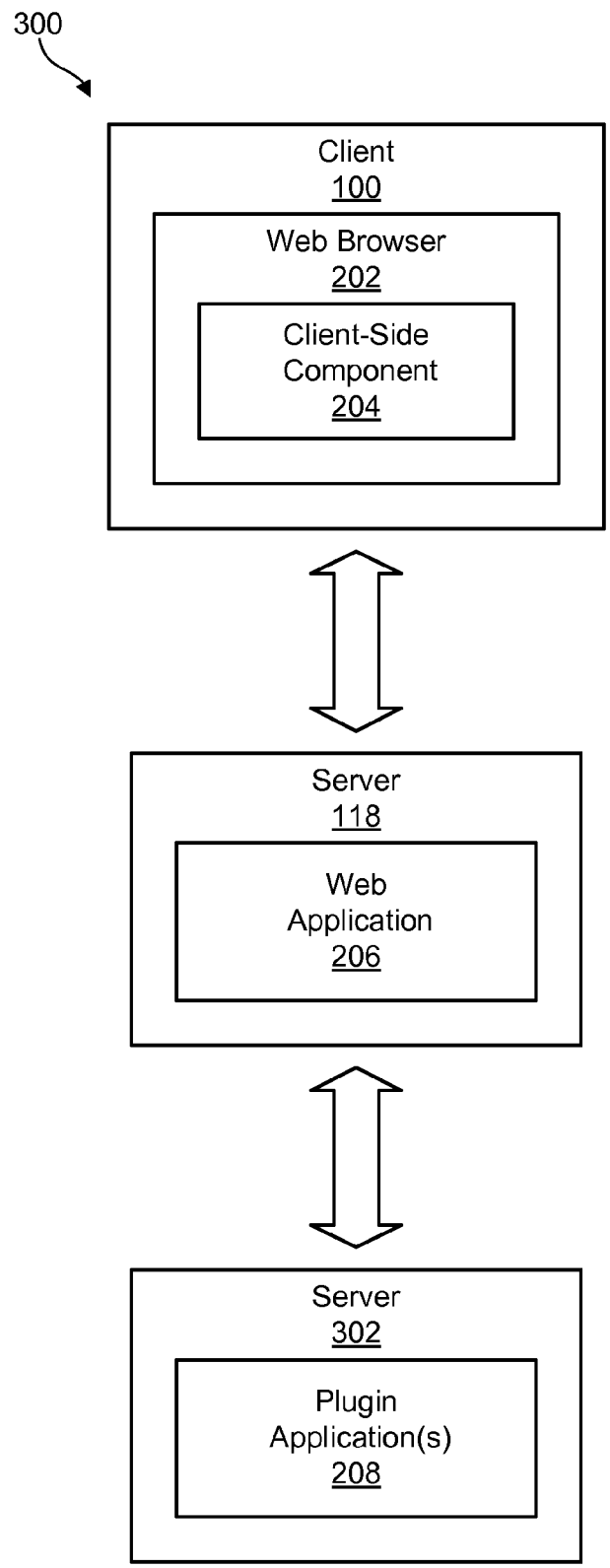
FIG. 3 is a high-level block diagram showing another conventional system and method for installing a web application plugin.

Referring to FIG. 3, another conventional system 300 for installing web application plugins is illustrated. In cases where new functionality 208 is not directly installable on an origin server 118, the origin server 118 may act as a proxy to another server 302 that offers the new functionality 208. In such a case, the origin server 118 may act on the client's behalf to retrieve or access new functionality 208 located on another server 302. In addition to introducing the administrative overhead and delay discussed above with respect to FIG. 2, this approach may also introduce unwanted complexity as well as various security issues.

One disadvantage of the conventional approaches illustrated in FIGS. 2 and 3 is that they can potentially compromise the security and/or privacy of a user using a particular plugin application 208. For example, because all requests are routed to an origin server 118, the origin server 118 will mediate all data exchanges and communications with the plugin application 208. This is the result of the "single origin policy," which is an important security concept for browser-side programming languages such as JavaScript. This policy permits scripts running on pages originating from the same site to access each other's methods and properties without any restrictions, but prevents access to most methods and properties originating from pages of different sites. Unfortunately, this policy may also have the undesired effect of exposing the origin server 118 to information that a user wants kept private. Thus, improved systems and methods are needed to discover, install, and utilize plugin applications 208 in a way that circumvents the single origin policy, while not compromising security.

Figure 4:
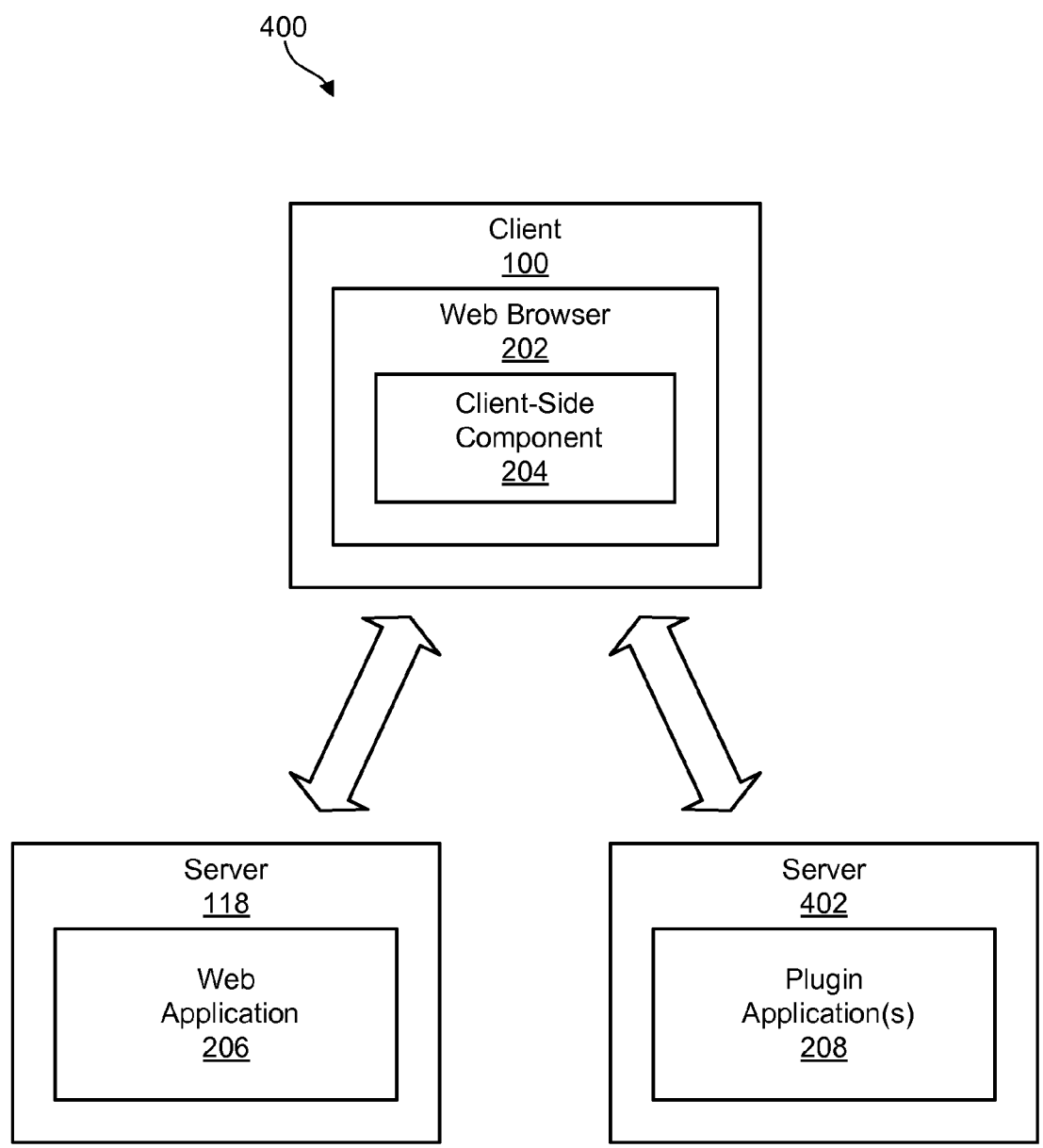
FIG. 4 is a high-level block diagram showing an improved system and method for discovering and installing web application plugins.

Referring to FIG. 4, a high-level view of one embodiment of an improved system 400 for discovering and installing web application plugins is illustrated. As shown, instead of modifying the origin server 118 where a web application 206 resides (as shown in FIG. 2), or modifying a server 302 for which the origin server 118 acts as a proxy (as shown in FIG. 3), the client-side component 204 is configured to discover and install plugin applications 208 in a way that circumvents the single origin policy while still preserving security. More specifically, the client-side component 204 is configured to discover and install plugin applications 208 on a different server 402 (and site) than the origin server 118. This allows a user to keep certain information private that may otherwise be exposed to the origin server 118. The details of how the system 400 works will be described in association with FIG. 5.

Figure 5:
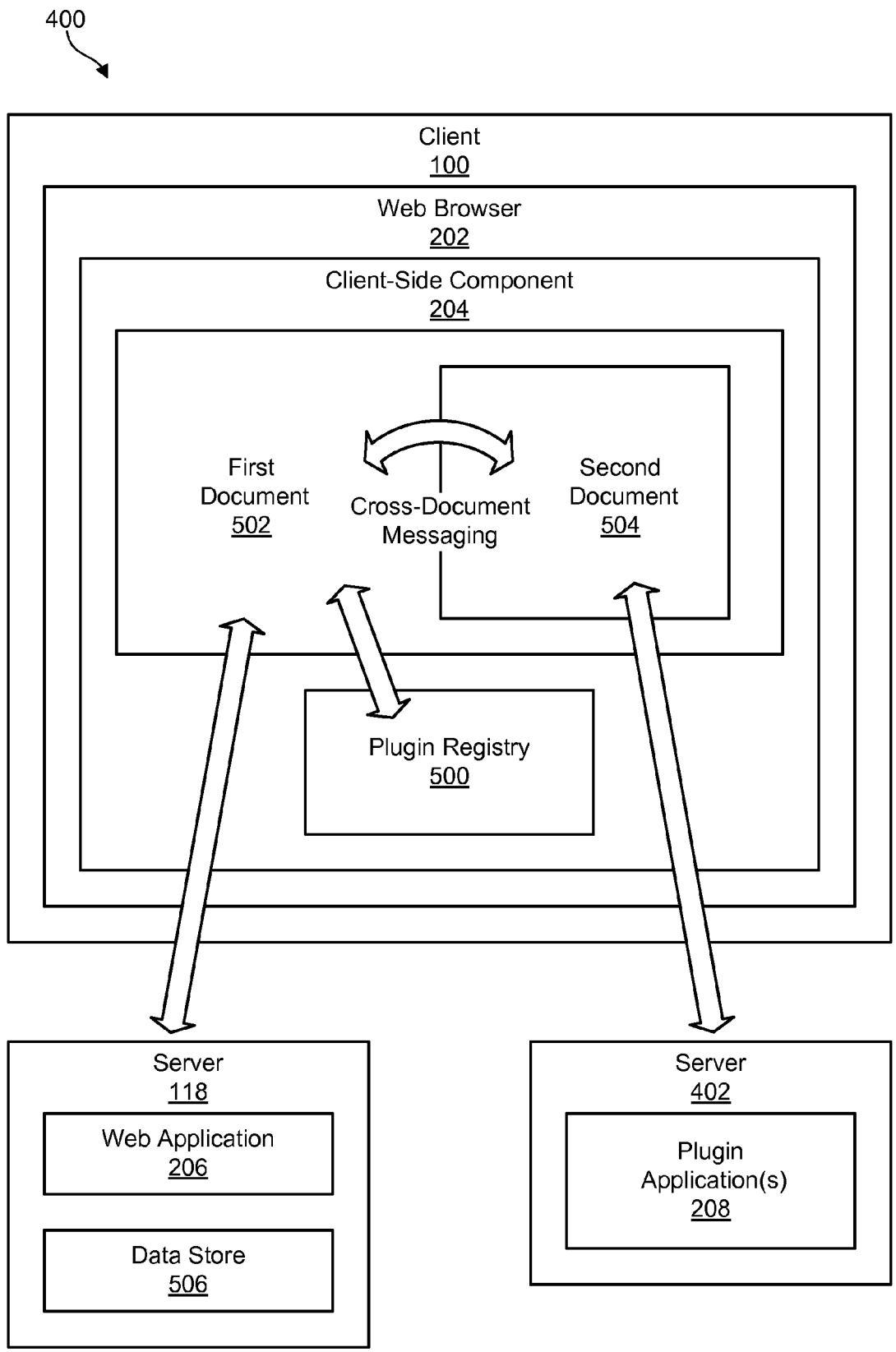
FIG. 5 is a high-level block diagram showing a more detailed view of the system and method of FIG. 4.

Referring to FIG. 5, a high-level block diagram showing a more detailed view of the system 400 of FIG. 4 is illustrated. As shown, a client-side component 204 includes a plugin registry 500 which stores metadata for each installed plugin 208 associated with a web application 206. In certain embodiments, the client-side component 204 uses the browser's "localStorage" or "sessionStorage" (i.e., storage provide by the browser 202) to implement the plugin registry 500. In certain embodiments, the plugin registry 500 is used in conjunction with a more durable data store 506 on the server 118, although this is not necessary. The server data store 506 may provide a way to ensure that if plugins 208 are installed on a first machine 100 (e.g., a personal desktop computer) of a user, the environment can be replicated on another machine (e.g., a laptop) of the user without having to reinstall the plugins 208. Thus, each machine 100 of a user may access the user's metadata in the data store 506.

In certain embodiments, the metadata in the plugin registry 500 may contain information needed to identify each installed plugin 208 (such as a Universal Resource Locator (URL) for each installed plugin 208). The metadata may also include data needed to provide an entry point into the client-side component 204 for each installed plugin 208 (i.e., inform the client-side component 204 of the capabilities provided by each installed plugin application 208). The metadata may also include information indicating how to load the functional capabilities of the installed plugins 208 into the client-side component 204 when the capabilities of the plugins 208 are needed.

As shown in FIG. 5, the client-side component 204 may host a first document 502 (e.g., a first HTML page) that originates from the origin server 118 hosting the web application 206. To install a new plugin 208, the client-side component 204 opens an inline frame (e.g., an HTML IFrame or Web Worker) in the first document 502. This inline frame hosts a second document 504 (e.g., a second HTML page) that originates from a site that hosts the plugin application 208. In most cases, this site (and plugin application 208) will reside on a different server 402 than the origin server 118.

The second document 504 is configured to use cross-document messaging (e.g., "window.postMessage") to communicate the plugin's metadata (which describes the plugin's capabilities and how to use the capabilities) to the client-side component 204. This, in essence, exposes the plugin's application programming interface (API) to the client-side component 204. At this point, the client-side component 204 may decide to discard the metadata if the plugin 208 does not provide the desired functionality. Alternatively, the client-side component 204 may decide to use the plugin's capabilities by exchanging data and parameters with the open inline frame using cross-document messaging in accordance with the API.

If the client-side component 204 wants to use the plugin 208 at a later time, the client-side component 204 (potentially with the authorization or input of a user) may conceptually "install" the plugin 208. Installing the plugin 208 may be as simple as recording all or part of the metadata received from the inline frame in the plugin registry 500. As described above, the metadata may include information describing the capabilities of the plugin 208 as well as information needed to locate and access the capabilities. When installation is complete, the client-side component 204 may close the associated inline frame or decide to immediately make use of the plugin's capabilities, in which case the inline frame may remain open. As mentioned above, the client-side component 204 may utilize the plugin's capabilities by exchanging data and parameters with the open inline frame using cross-document messaging.

If the client-side component 204 closes the inline frame but later decides to use the plugin's capability, the client-side component 204 may simply open a new inline frame and locate the plugin application 208 using the identity information stored in the plugin registry 500. The client-side component 204 may then utilize the plugin's capabilities using cross-document messaging as described above. To uninstall a plugin 208, the client-side component 204 may simply delete the plugin's metadata from the plugin registry 500. This may include deleting the plugin's metadata from the server data store 506 if such a data store 506 exists.

In certain embodiments, to take advantage of the capabilities of an installed plugin in a certain context or situation, the client-side component 204 may provide a context menu whose entries are supplied from the metadata in the plugin registry 500. For example, consider the case where the web application 206 is an online text editor used to edit program code, such as JavaScript, and the plugin application 208 (hereinafter referred to as a "coloring plugin" 208) is a software application used to color different portions of the program code in accordance with the code's syntax, thereby making the program code more readable.

In one embodiment, in order to utilize the functionality of the coloring plugin 208, the user may right click on a portion of the program code to reveal the above-described context menu. This context menu may display a list of one or more plugin applications 208 that may be used to perform various operations or transformations on the text of the program code. Selecting the coloring plugin option from the context menu may trigger the opening of an inline frame to load the coloring plugin 208. The functionality of the coloring plugin 208 may then be accessed by exchanging data and parameters with the inline frame using cross-document messaging. For example, the client-side component 204 could pass the program code to the coloring plugin application 208 using cross-document messaging and the coloring plugin application 208 could operate on the program code and return the syntax-colored program code to the client-side component 204 by way of cross-document messaging. The client-side component 204 may then display the syntax-colored program code to the user for editing.

Later, the user may choose to uninstall the coloring plugin 208. This will delete the coloring plugin's metadata from the plugin registry 500. The next time the user uses the online text editor and right clicks on the program code, a context menu will appear that omits the coloring plugin 208 as an option.

Other techniques or graphical elements (other than a context menu) may be used to trigger the opening of inline frame and loading of an associated plugin application 208. The example provided above is simply an example and is not intended to be limiting.

The systems and methods discussed in association with FIGS. 4 and 5 provide various advantages over conventional systems and methods for installing plugin applications 208. For example, the improved systems and methods may be implemented without modifying the origin server 118. This reduces the chance that the origin server 118 will be destabilized. The systems and methods may also reduce networking and trust overhead that is introduced by using the origin server 118 as a proxy to another server 302. Because the plugin application 208 is isolated from the host web application 206, the implementer is free to implement the plugin application 208 as he or she sees fit. Furthermore, the disclosed systems and methods may provide increased security and privacy to users since communications with the plugin application 208 are not necessarily routed through the origin server 118.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for discovering and installing web application plugins, the method comprising:
   initiating a client-side component of a server-based web application, the client side-component hosting a first document;
   opening, by the client-side component, an inline frame within the first document, the inline frame hosting a second document different from the first document;
   using cross-document messaging to communicate, from the second document to the first document, metadata describing a plugin's capabilities, the metadata further providing an API to access the plugin's capabilities via cross-document messaging; and
   utilizing the capabilities of the plugin using cross-document messaging in accordance with the API.

2. The method of claim 1, wherein the first document is hosted by a first web site, and the second document is hosted by a second web site different from the first web site.

3. The method of claim 2, wherein the first web site is hosted on a first server, and the second web site is hosted on a second sever different from the first server.

4. The method of claim 1, wherein the first and second documents are HTML documents.

5. The method of claim 1, further comprising persisting the metadata on a server hosting the server-based web application.

6. The method of claim 1, further comprising installing, by the client-side component, the plugin by recording the metadata in a plugin registry.

7. The method of claim 6, wherein using the plugin comprises initially selecting the plugin from a menu.

8. The method of claim 7, wherein the menu lists plugins registered in the plugin registry.

9. The method of claim 6, further comprising uninstalling, by the client-side component, the plugin by deleting the metadata from the plugin registry.

10. The method of claim 1, wherein opening an inline frame comprises opening one of an HTML IFrame and a Web Worker.

11. A computer program product for discovering and installing web application plugins, the computer program product comprising a non-transitory computer-readable storage medium having computer-usable program code embodied therein, the computer-usable program code comprising:
   computer-usable program code to initiate a client-side component of a server-based web application, the client side-component hosting a first document;
   computer-usable program code to open an inline frame within the first document, the inline frame hosting a second document different from the first document;
   computer-usable program code to use cross-document messaging to communicate, from the second document to the first document, metadata describing a plugin's capabilities, the metadata further providing an API to access the plugin's capabilities via cross-document messaging; and computer-usable program code to utilize the capabilities of the plugin using cross-document messaging in accordance with the API.

12. The computer program product of claim 11, wherein the first document is hosted by a first web site, and the second document is hosted by a second web site different from the first web site.

13. The computer program product of claim 12, wherein the first web site is hosted on a first server, and the second web site is hosted on a second sever different from the first server.

14. The computer program product of claim 11, wherein the inline frame is selected from an HTML IFrame and a Web Worker.

15. The computer program product of claim 11, further comprising computer-usable program code to install the plugin by storing the metadata in a plugin registry of the client-side component.

16. A system for discovering and installing web application plugins, the system comprising:

a first server hosting a web application;

a second server hosting a plugin for the web application; and a client computer hosting a client-side component of the web application, the client-side component hosting a first document, wherein the client-side component is configured to:

open an inline frame within the first document, the inline frame hosting a second document different from the first document;

use cross-document messaging to communicate, from the second document to the first document, metadata describing a plugin's capabilities, the metadata further providing an API to access the plugin's capabilities via cross-document messaging; and utilize the capabilities of the plugin using cross-document messaging in accordance with the API.

17. The system of claim 16, wherein the inline frame is one of an HTML IFrame and a Web Worker.

18. The system of claim 16, wherein the client-side component is configured to install the plugin by recording the metadata in a plugin registry.

19. The system of claim 18, wherein the client-side component is configured to uninstall the plugin by deleting the metadata from the plugin registry.

20. The system of claim 16, wherein the first and second documents are HTML documents.

\* \* \* \* \*